US009573297B2

(12) United States Patent
Reza Youssefi et al.

(10) Patent No.: US 9,573,297 B2
(45) Date of Patent: Feb. 21, 2017

(54) METHOD AND SYSTEM FOR ENHANCING POLYMERIZATION AND NANOPARTICLE PRODUCTION

(76) Inventors: Reza Reza Youssefi, Tehran (IR); Somayeh Mohammadi, Tehran (IR)

( * ) Notice: Subject to any disclaimer, the term of this patent is extended or adjusted under 35 U.S.C. 154(b) by 474 days.

(21) Appl. No.: 13/300,656

(22) Filed: Nov. 21, 2011

(65) Prior Publication Data
US 2013/0127080 A1    May 23, 2013

(51) Int. Cl.
*B29B 9/12*    (2006.01)
*B29B 9/00*    (2006.01)
*B82Y 40/00*   (2011.01)

(52) U.S. Cl.
CPC ............ *B29B 9/00* (2013.01); *B29B 2009/125* (2013.01); *B82Y 40/00* (2013.01)

(58) Field of Classification Search
CPC ............... B29B 9/10; B29B 9/12; B29B 9/16; B29B 2009/12; B29B 2009/125; B01J 2/02; B01J 2/12; B01J 2/14; B01F 5/221; C03B 19/1015; B22F 9/12
USPC ..................................................... 425/8; 264/8
See application file for complete search history.

(56) References Cited

U.S. PATENT DOCUMENTS

| | | | | |
|---|---|---|---|---|
| 3,288,052 A * | 11/1966 | Hough | ............................ | 99/485 |
| 3,597,176 A * | 8/1971 | Plumat | ........................... | 65/21.2 |
| 3,716,315 A * | 2/1973 | King | ................................ | 425/8 |
| 3,801,326 A * | 4/1974 | Claes | ............................ | 430/642 |
| 4,047,862 A * | 9/1977 | Keith | ................................ | 425/8 |
| 4,078,873 A * | 3/1978 | Holiday et al. | ................. | 425/8 |
| 4,256,677 A * | 3/1981 | Lee | .................................. | 264/8 |
| 4,303,433 A * | 12/1981 | Torobin | ........................ | 65/21.4 |
| 4,343,750 A * | 8/1982 | Holiday et al. | ................. | 75/334 |
| 4,350,562 A * | 9/1982 | Bonu | ............................ | 438/748 |
| 4,374,074 A * | 2/1983 | Ueda et al. | ....................... | 264/8 |
| 4,419,061 A * | 12/1983 | Patterson, II | ..................... | 425/8 |
| 4,435,342 A * | 3/1984 | Wentzell | ........................ | 75/334 |
| 4,544,446 A * | 10/1985 | Cady | ............................ | 438/689 |
| 4,622,687 A * | 11/1986 | Whitaker et al. | ............. | 378/130 |
| 4,789,105 A * | 12/1988 | Hosokawa et al. | ............. | 241/67 |
| 5,163,626 A * | 11/1992 | Urwin et al. | ..................... | 241/1 |

(Continued)

OTHER PUBLICATIONS

Brechtelsbauer et al, Evaluation of a Spinning Disc Reactor for Continuous Porcessing, 2001, Organic Process Research and Development, 5, 65-68.*

(Continued)

*Primary Examiner* — Timothy Kennedy
(74) *Attorney, Agent, or Firm* — Barry Choobin; Patent 360

(57) ABSTRACT

The various embodiments herein provide a system and method for enhancing polymerization and nanoparticles production using a disc reactor. The system comprises a rotating disc comprising a first surface and a second surface arranged longitudinally along a single axis of rotation, a shaft attached to the rotating disc, a ring provided on top of the first surface of the rotating disc, at least one feed inlet for providing a feed solution, a fluid inlet for providing a heat transfer fluid, a fluid outlet for exiting the heat transfer fluid, a product collector for collecting the produced nanoparticles and a product outlet for exiting the produced nanoparticles. The feed solution flows from the first surface to the second surface of the rotating disc due to centrifugal forces and gets accumulated on the product collector and exits from the disc reactor through the product outlet.

5 Claims, 2 Drawing Sheets

(56) References Cited

U.S. PATENT DOCUMENTS

| | | | | |
|---|---|---|---|---|
| 5,308,458 | A | * | 5/1994 | Urwin et al. ............... 204/157.6 |
| 5,395,649 | A | * | 3/1995 | Ikeda ............................ 427/240 |
| 5,437,892 | A | * | 8/1995 | Nagayama et al. ........ 427/372.2 |
| 5,624,999 | A | * | 4/1997 | Lombardi et al. ............... 525/52 |
| 5,735,931 | A | * | 4/1998 | Featherstone ............ C21B 3/08 425/8 |
| 5,891,479 | A | * | 4/1999 | Sheridon ............................ 425/8 |
| 5,900,192 | A | * | 5/1999 | Richley ............................... 264/8 |
| 5,972,507 | A | * | 10/1999 | Morimoto et al. ............ 428/402 |
| 5,976,428 | A | * | 11/1999 | Richley ............................ 264/10 |
| 6,097,531 | A | * | 8/2000 | Sheridon ........................ 359/296 |
| 6,273,104 | B1 | * | 8/2001 | Shinbara et al. ............. 134/25.4 |
| 6,398,879 | B1 | * | 6/2002 | Satou et al. ..................... 134/33 |
| 6,403,729 | B1 | * | 6/2002 | Hergeth et al. ................. 526/68 |
| 6,482,960 | B1 | * | 11/2002 | Brechtelsbauer et al. .... 549/332 |
| 6,521,430 | B1 | * | 2/2003 | Orwar et al. ............. 435/173.6 |
| 6,832,616 | B2 | * | 12/2004 | Miyazaki ..................... 134/98.1 |
| 6,858,189 | B1 | * | 2/2005 | Ramshaw et al. ............. 422/186 |
| 6,977,063 | B1 | * | 12/2005 | Ramshaw et al. ............. 422/135 |
| 7,041,751 | B2 | * | 5/2006 | Jachuck et al. ................. 526/88 |
| 7,074,353 | B2 | * | 7/2006 | Jachuck et al. .................... 264/7 |
| 7,115,235 | B1 | * | 10/2006 | Ramshaw et al. ............. 422/135 |
| 7,683,142 | B2 | * | 3/2010 | Lai et al. ......................... 526/65 |
| 2003/0161767 | A1 | * | 8/2003 | Ramshaw et al. ....... 422/186.29 |
| 2004/0235406 | A1 | * | 11/2004 | Duescher ...................... 451/527 |
| 2004/0236039 | A1 | * | 11/2004 | Jachuck ........................... 526/62 |
| 2004/0241430 | A1 | * | 12/2004 | Jachuck et al. ................ 428/330 |
| 2005/0181127 | A1 | * | 8/2005 | Hamada et al. ............... 427/240 |
| 2007/0007677 | A1 | * | 1/2007 | Blair et al. ........................ 264/8 |
| 2007/0082287 | A1 | * | 4/2007 | Wolfe et al. ............. 430/137.14 |
| 2007/0082980 | A1 | * | 4/2007 | Lai et al. ......................... 524/35 |
| 2007/0297957 | A1 | * | 12/2007 | Burns et al. ................... 422/198 |
| 2008/0008834 | A1 | * | 1/2008 | Collins et al. ................. 427/282 |
| 2008/0038115 | A1 | * | 2/2008 | Burns et al. ................ 415/213.1 |
| 2008/0267843 | A1 | * | 10/2008 | Burns et al. ................... 422/198 |
| 2009/0266202 | A1 | * | 10/2009 | Tai et al. ......................... 75/371 |
| 2010/0112210 | A1 | * | 5/2010 | Uchida .......................... 427/240 |
| 2011/0177243 | A1 | * | 7/2011 | Houben et al. ................ 427/212 |

OTHER PUBLICATIONS

Loh et al, Spinning Disc Processing Technology: Potentional for Large-Scale Manufacture of Chitosan Nanoparticles, 2010, J. of Pharmaceutical Sciences, vol. 99, No. 10, 4326-4336.*

Tai et al, Synthesis of Magnesium Hydroxide and Oxide Nanoparticles Using a Spinning Disk Reactor, 2007, Ind. Eng. Chem. Res, 46, 17, 5536-5541.*

Hartlieb et al, Controlled Scalable Synthesis of ZnO Nanoparticles, 2007, Chemistry of Material, vol. 19, No. 23, 5453-5459.*

Oxley et al, Evaluation of Spinning Disk Reactor Technology for the Manufacture of Pharmaceuticals, 2000, Ind. Eng. Chem. Res. 39, 2175-2182.*

Cafiero et al, Process Intensification: Precipitation of Barium Sulfate Using a Spinning Disk Reactor, 2002, Ind. Eng. Chem. Res., 41, 5240-5246.*

Tai et al, Preparation of Silver Nanoparticles Using a Spinning Disk Reactor in a Continuous Mode, 2009, Ind. Eng. Chem. Res., 48, 10104-10109.*

Boodhoo et al, Application of the Spinning-Disc Technology for Process Intensification in the Chemical Process Industry, 2001, Processing by Centrifugation, Edited by Regel and Wilcox, Kluwer Academic/Plenum Publishers, 7-17.*

Anantachoke et al, Fine Tuning the Production of Nanosized Beta-Carotene Particles Using Spinning Disk Processing, 2006, J. American Chem Soc., 128, 13847-13853.*

Tai et al, A Green Process for Preparing Silver Nanoparticles Using Spinning Disk Reactor, 2008, AlChE Journal, vol. 54, No. 2, 445-452.*

* cited by examiner

METHOD AND SYSTEM FOR ENHANCING POLYMERIZATION AND NANOPARTICLE PRODUCTION

BACKGROUND

Technical Field

The embodiments herein generally relate to polymerization and particularly to a polymerization process for producing nanoparticles of different sizes. The embodiments herein more particularly relate to a method and system for improving the rate of polymerization and Nanoparticle production using spinning disc reactors.

Description of the Related Art

Polymerization is a process of bringing about a reaction between monomer molecules in a chemical reactor to form three-dimensional networks or polymer chains. In nanotechnology, a particle is defined as a small object that behaves as a whole unit in terms of its transport and properties. The particles are further classified according to size in terms of diameter; coarse particles range between 10,000 and 2,500 nanometers, fine particles are sized between 2,500 and 100 nanometers and ultrafine particles or nanoparticles are sized between 1 and 100 nanometers.

Conventional polymerization methods employ a disc technology which facilitates the mixing of different polymerizing constituents and also facilitates the transfer of the heat and mass during the polymerization process. The polymerization process uses a spinning disc reactor rotatable about an axis, which results in generation of centrifugal force. In these methods a spinning disc reactor having a stationary plate over the collector surface is used. The use of a stationary plate in conjunction with a spinning plate creates a space between plate and the reactor surface. This distance provides a limited space between the two surfaces of the disc used for rotation of the polymerizing constituents. Due to the limited speed of rotation of the disc used in the reactor, the polymerization process becomes less productive as the speed variations needed for the different fluids are not defined.

In another prior art method, the disc reactor is provided with a collector surface which encloses the disc reactor so that a film of feed solution produced gets collected. However, as some fluids have low viscosity, they stick to the surface of the collector. To remove the accumulated fluid, the disc reactor needs to be stopped which hampers the continuous polymerization process.

Another prior art method provides a disc reactor which has rotating discs for producing a thin film of feed solution and hence, facilitates the polymerization process. The feed solution is fed at the center or near the center of the axis of rotation of a shaft which is attached to the rotating disc. Since the torque is offered at the center or near the center of the rotating disc, the centrifugal force offered to the feed solution is very less. Hence the feed solution takes much time to accelerate towards the corner of the disc which in turn makes the polymerization process much slower.

Hence there is a need for a system and method to increase the rate of polymerization process. There is also a need for a system and method to reduce the production loss incurred due to feed solution accumulation. Further there also exists a need to enhance the effectiveness of the polymerization process.

The abovementioned shortcomings, disadvantages and problems are addressed herein and which will be understood by reading and studying the following specification.

SUMMARY

The primary object of the embodiments herein is to provide a system and method for enhancing production of nanoparticles by increasing the polymerization rate.

Another objective of the embodiments herein is to provide a system and method which provides for production of nanoparticles of various sizes.

Yet another object of the embodiments herein is to provide a system and method to provide for variable rotational speeds to a rotating disc incorporated in the disc reactor system.

Yet another object of the embodiments herein is to provide a system and method which does not require the disc reactor to be stopped in between the nanoparticle production process.

Yet another object of the embodiments herein is to provide a system and method to reduce production loss due to sticking of the fluid material on the collector surface.

The various embodiments herein provide a system for enhancing polymerization and nanoparticle production process. The system comprising, a rotating disc comprising a first surface and a second surface arranged longitudinally along a single axis of rotation, a shaft attached to the rotating disc, a ring provided on top of the first surface of the rotating disc, at least one feed inlet for providing a feed solution to the rotating disc, a fluid inlet for providing a heat transfer fluid within a body of the shaft, a fluid outlet provided in a chamber surrounding the shaft for exiting the heat transfer fluid, a product collector for collecting the produced nanoparticles and at least one product outlet provided on the product collector for exiting the produced nanoparticles. The feed solution provided on the first surface of the rotating disc flows from the first surface of the rotating disc in the form of a thin film to the second surface of the rotating disc due to centrifugal forces and strikes walls of the product collector and gets accumulated on the bottom of the product collector which exits from the disc reactor through the product outlet.

According to an embodiment herein, the disc reactor system further comprising a means to provide at least one of a radiation and catalyst to accelerate the polymerization process.

According to an embodiment herein, the heat transfer fluid is provided to a surface between the first surface and the second surface of the rotating disc to enable heat transfer from both the first surface and the second surface.

According to an embodiment herein, the disc reactor system further comprising a reactor seat for suppressing the vibrations generated during rotation of the shaft and the rotating disc.

According to an embodiment herein, the rotating disc is further connected to a ball bearing arrangement and a gear box for rotating the first surface and the second surface at different speeds.

According to an embodiment herein, the disc reactor system comprising one or more flanges provided on the first surface of the disc reactor to hold the ball bearing arrangement.

According to an embodiment herein, the disc reactor system further comprising one or more fluid spraying nozzles to prevent produced nanoparticles from sticking on to the product collector wall.

According to an embodiment herein, the first surface and the second surface of the rotating disc are at-least one of same or varying depths.

According to an embodiment herein, the product collector further includes at least one heat exchange arrangement to regulate the temperature during nanoparticle production.

According to an embodiment herein, the product collector further comprises at least one stirrer shaft.

According to an embodiment herein, the disc reactor system further comprises a gas inlet and a gas outlet, where the gas is at least one of a reactant to protect the polymerization process and a heat carrier.

Embodiments herein further provide a method for providing polymerization and nanoparticle production in a disc reactor. The method comprising steps of providing a feed solution to a first surface and a second surface of a rotating disc of the disc reactor, providing a heat transfer fluid to carry away heat for fastening the rate of precipitation, directing the feed solution towards an edge of the rotating disc, forming a thin film of the feed solution, subjecting the thin film of feed solution to a high centrifugal acceleration provided by the rotating disc and collecting nanoparticles in a product collector. The centrifugal forces created due to the rotation of the rotating disc directs the flow of the feed solution from the first surface in the form of a thin film to the second surface which strikes walls of the product collector and gets accumulated on the bottom of a product collector and is exited from the product collector through a product outlet.

According to an embodiment herein, the method further comprising providing at least one of a radiation agent and catalyst to enhance the polymerization process.

According to an embodiment herein, the nanoparticle production and separation process is in the form of at least one of solid and liquid droplets.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1:
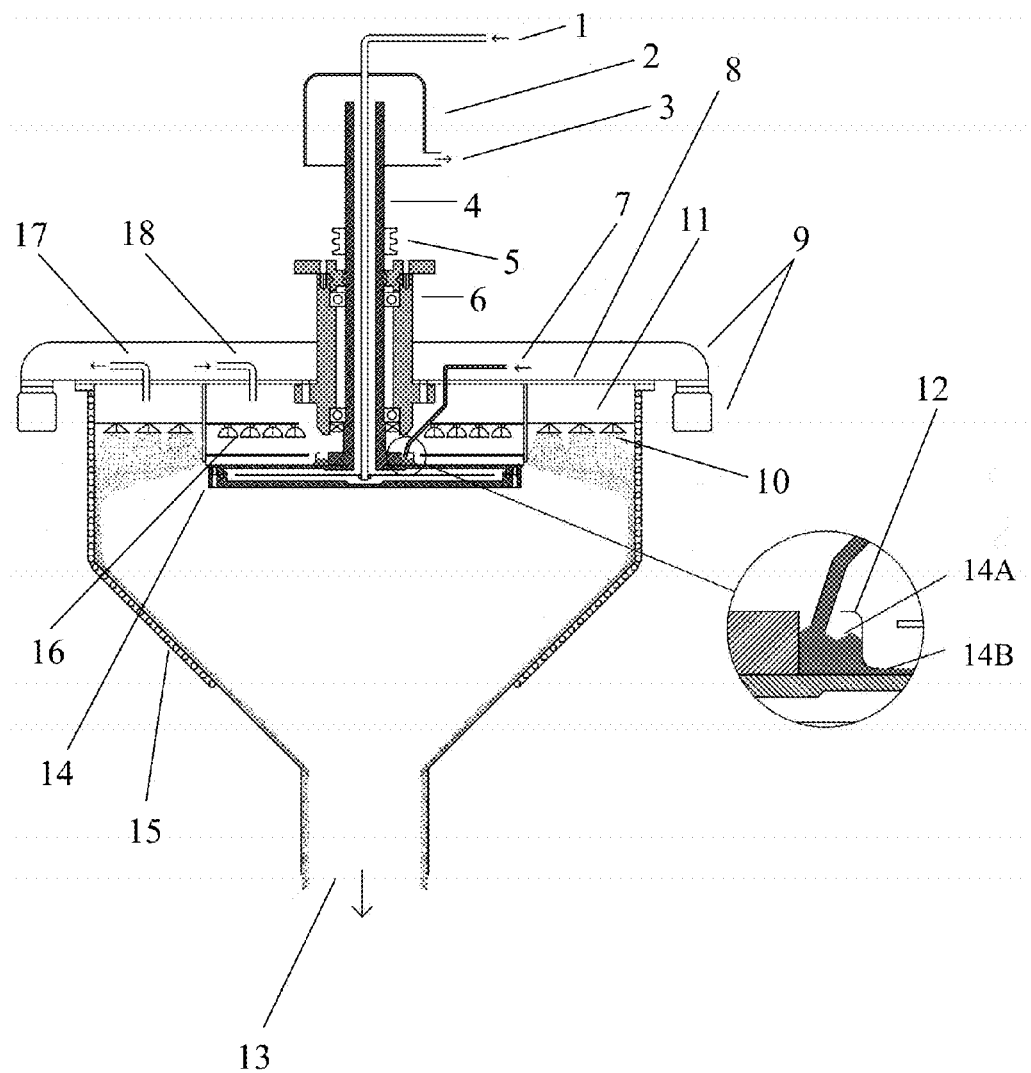
FIG. 1 illustrates a cross-sectional view of a disc reactor system for enhancing polymerization rate for producing Nanoparticles, according to an embodiment herein.
Figure 2:
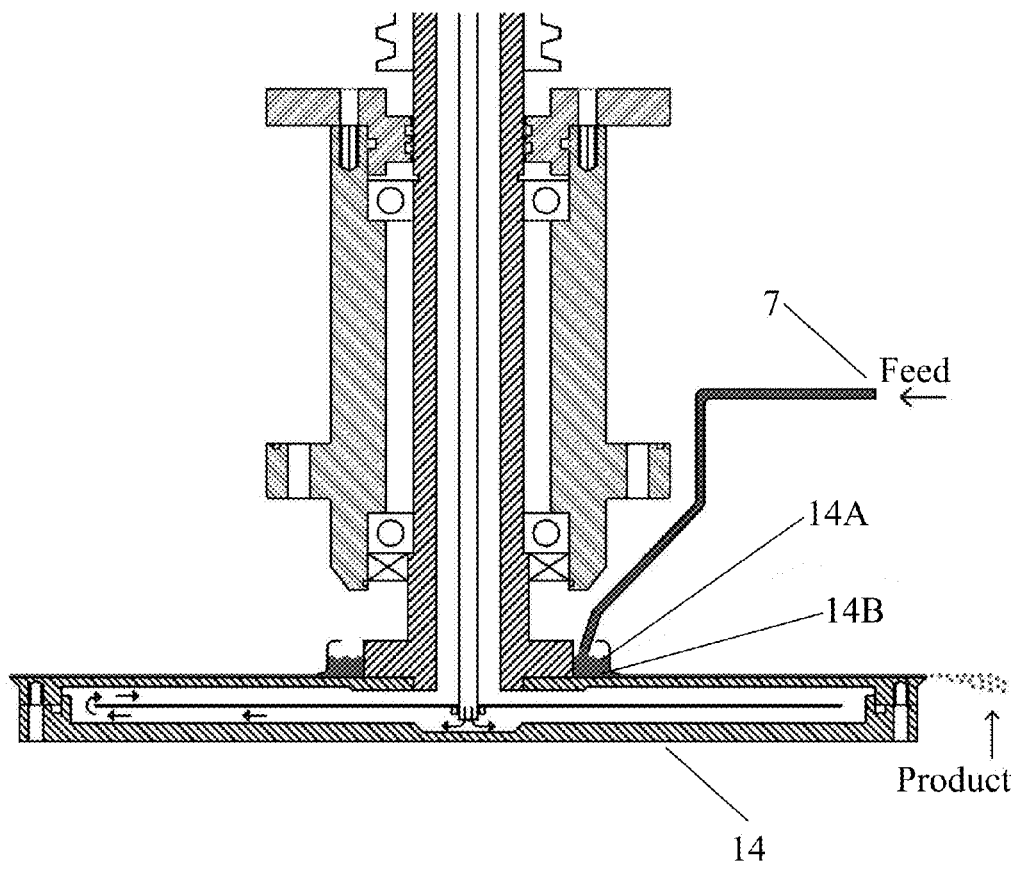
FIG. 2 is a cross sectional view of the disc reactor system illustrating a flow of heat transfer fluid through the disc reactor, according to an embodiment herein.

Although specific features of the embodiments herein are shown in some drawings and not in others. This is done for convenience only as each feature may be combined with any or all of the other features in accordance with the embodiments herein.

DETAILED DESCRIPTION

In the following detailed description, reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a system for enhancing polymerization rate and nanoparticle production process. The system includes a rotating disc comprising a first surface and a second surface arranged longitudinally along a single axis of rotation, a shaft attached to the rotating disc, a ring provided on top of the first surface and the second surface of the rotating disc, at least one feed inlet for providing a feed solution to the rotating disc, a fluid inlet for providing a heat transfer fluid within a body of the shaft, a fluid outlet provided in a chamber surrounding the shaft for exiting the heat transfer fluid, a product collector for collecting the produced nanoparticles and at least one product outlet provided on the product collector for exiting the produced nanoparticles. The feed solution provided on the first surface of the rotating disc flows from the first surface in the form of a thin film to the second surface of the rotating disc due to centrifugal forces and subsequently, strikes the walls of the product collector and gets accumulated on the bottom of the product collector, and finally exits from the disc reactor through the product outlet.

The shaft is hollow in structure and is attached to a the rotating disc in order to provide support for the rotating disc. The hollow structure of the shaft provides the arrangement of a fluid pipe for the passage of the heat transfer fluid. The rotating disc is made up of two surfaces, the first surface and the second surface, which are arranged parallel to each other longitudinally along the same axis of rotation. The spacing between the first surface and the second surface of the rotating disc is typically adjustable which facilitates the spreading of the feed solution. The feed solution enters through an inlet to the first surface of the rotating disc at a predetermined distance from the centre of axis of rotation. The shaft, which is connected to the rotating disc, holds a gear mechanism and ball bearing arrangement which facilitates variation of the rotational speed of the rotating disc. The rotation of the disc is controlled based on the required size of the Nanoparticles to be produced. Fluid coupling arrangement provided on top of the shaft includes a fluid inlet for providing a heat transfer fluid (hot or cold) within the body of the shaft wherein the fluid inlet's length is same as that of the shaft. The fluid coupling arrangement further includes a fluid outlet for the heat transfer fluid to exit from the disc reactor. The heat transfer fluid facilitates heat variations as required for polymerization of the feed solution from the instant the feed solution is fed to the rotating disc. The heat variations provided by heat transfer fluid continues until the feed solution exits through a fluid spray nozzle. The fluid coupling acts as a bypass collector for the heat transfer fluid.

According to an embodiment herein, the disc reactor further includes an inlet and outlet for circulating a gaseous material preferably for carriage of the heat produced during reaction taking place in the disc reactor. The gaseous material provided in the disc reactor is either reactive or inert in nature as required for the reactions taking place in the disc reactor. The gaseous material facilitates a faster precipitation of the feed solution.

The disc reactor further comprises a belt drive coupling attached to the shaft. The belt drive coupling controls the rotational motion of the shaft and the rotating disc. The disc reactor system further comprises one or more flanges provided on the first surface of the rotating disc to hold the ball bearings. The flanges are made up of a suitable rigid material and are provided for facilitating the necessary movement to the rotating disc, whenever needed. The feed solution is sprayed down through the fluid spray nozzle to a product collector. The disc reactor is attached to a reactor seat. The reactor seat is provided for suppressing the vibrations occurring during rotation of the shaft and the rotating disc.

According to an embodiment herein, the disc reactor includes a product collector which collects the Nanoparticles sprayed through a the fluid spray nozzle. The feed solution produced is in at least one of a liquid form, semi-solid form or solid form. The feed solution so produced is subjected to high centrifugal acceleration due to the rotational motion by the rotating disc. The heat transfer fluid is highly viscous in nature. The layers of the heat transfer fluid which are closer to the rotating disc surfaces are accelerated at higher speed than those layers which are relatively farther. Thus the subsequent layers of the film of the feed solution spread and flow to the outer edge of the rotating disc at different speeds. As the subsequent layers of the feed solution flow to the outer edge at different speeds, the small droplets resulting from the centrifugal acceleration tends to come out of the rotating disc from different points. A jag arrangement is provided on the outer surface of the rotating discs forces the highly accelerated feed solution to spray out in the form of Nanosized particles. The size of thus sprayed feed solution is in nanometers and the size is influenced and maintained by controlling the thickness of the feed solution spread over the rotating disc. The controlling of the thickness is done through the ring provided on top of the first surface of the rotating disc. The fluid spraying nozzle arrangement provided to spray the Nanoparticles produced in the disc reactor prevents the sticking of the heat transfer fluid material on the product collector's inner wall. The collector is either in circular or cone shaped, with different shapes of body and a bottom which has two surfaces.

Further the disc reactor includes one or more radiation devices provided near the area of the reaction. The radiation devices are sources of different wavelength of rays like UV ray, Infrared ray, alpha, beta, gamma rays and the like. As some of the reactions need the exposure to suitable rays for their feasibility, they would be subjected to the corresponding rays. Further the surfaces of the rotating disc, in contact with the feed solution is are wholly or partially fixed with one or different catalysts.

Embodiments herein further provide a method for providing polymerization and nanoparticle production in a disc reactor. The method comprising steps of providing a feed solution to a first surface and a second surface of a rotating disc of the disc reactor, providing a heat transfer fluid to carry away heat for fastening the rate of precipitation, directing the feed solution towards an edge of the rotating disc, forming a thin film of the feed solution, subjecting the thin film of feed solution to a high centrifugal acceleration provided by the rotating disc and collecting nanoparticles in a product collector. The centrifugal forces created due to the rotation of the rotating disc direct the flow of the feed solution from the first surface in the form of a thin film to the second surface which strikes walls of the product collector and gets accumulated on the bottom of a product collector and is exited from the product collector through a product outlet.

FIG. 1 illustrates a cross-sectional view of a disc reactor system for enhancing polymerization rate for producing Nanoparticles, according to an embodiment herein. The disc reactor system comprises a fluid inlet 1, a fluid coupling chamber 2, a hot/cool fluid outlet 3, a shaft 4, a belt drive coupling 5, one or more flanges 6, a feed inlet 7, a reactor door 8, a reactor seat 9, a fluid spray nozzle 10, a surface for limiting the gas flow area 11, a ring 12, a product outlet 13, a rotating disc 14, a product collector 15, one or more radiation devices 16, an inlet for gaseous material 18 and an outlet for gaseous material 17.

The shaft 4 is attached to the rotating disc 14 for providing support for rotation of the rotating disc 14. The rotating disc is made up of two surfaces, a first surface 14A and the second surface 14B, which are arranged parallel to each other, longitudinally along the same axis of rotation. Both the first surface 14A and the second surface 14B of the rotating disc 14 are communicably coupled to the shaft 4 so that the axis of rotation of the shaft 4 and the rotating disc 14 are same. The first surface 14A and the second surface 14B of the rotating disc 14 are further connected to a ball bearing arrangement and gear box. The first surface 14A and the second surface 14B of the rotating disc 14 rotate at different speeds. The rotation of the disc 14 is controlled based on the desired size of the Nanoparticles.

The disc reactor system is provided with one or more flanges 6 on the upper portion of the disc reactor system 19. The flanges 6 are made up of a suitable rigid material and are provided for facilitating the necessary movement to the disc reactor. The disc reactor system 19 is attached with a reactor seat 9. The reactor seat 9 is provided for suppressing the vibrations generated during rotation of the shaft 4 and the rotating disc 14. A reactor door 8 is provided as a base chassis over which the components of the disc reactor system 19 are installed.

The disc reactor further comprising a feed inlet 7 to provide a feed solution to the rotating disc 14. The feed solution includes monomers and addictives which enter the reactor as a primary material preferably chosen for the formulation of the desired size of Nanoparticles. The feed solution is fed on the first surface 14A of the rotating disc 14 at a predetermined distance from the central axis of rotation of the shaft 4 and the rotating disc 14. The feed solution is fed at certain distance from the centre of axis of rotation to provide high initial acceleration as the centrifugal acceleration at the center and in an area near to the center is zero or very low. The disc reactor can be equipped with devices for providing radiations to feed solution for producing energy or for heating the feed solution or for vibrating the feed which enters to the rotating disc. Additionally, the first surface 14A and the second surface 14B of the disc reactor which is in contact with the feed solution can be partially or wholly fixed with catalyst to enhance the production of nanoparticles.

The fluid inlet 1 is provided for a passing heat transfer fluid (hot or cold) through the shaft 4. The fluid coupling 2 is positioned on the top of the shaft 4. The fluid coupling 2 acts as a bypass collector for the fluid. After getting accumulated in the fluid coupling 2, the heat transfer fluid exits through the fluid outlet 3 provided on the fluid coupling 2. Simultaneously fresh heat transfer fluid enters the disc reactor through the fluid inlet 1. The heat transfer fluid provides for the heat variations as required for polymerization of the feed solution. The heat variations are started at the instant when the feed solution is fed to the rotating disc 14 and are made to continue the transfer of heat until the feed solution exits through the fluid outlet 3.

The disc reactor further comprises an inlet for a gaseous material 18 and an outlet 17 for a gaseous material. The gaseous material is allowed to continuously flow through the rotating disc 14. The gaseous material enters the disc reactor through the inlet 18 provided at a suitable place. The heat produced during the reactions is carried out to external atmosphere through the gas outlet 17. The gaseous material is either reactive or inert in nature depending upon the necessities for the reaction taking place in the disc reactor. As the reactions taking place in the disc reactor are mainly exothermic reactions, the gaseous material is provided in addition to the heat transfer fluid to carry away the heat produced during the reaction taking place in the disc reactor. The heat transfer fluid flow path is restricted to predetermined areas through a chamber provided on the surroundings of the rotating disc 14.

The disc reactor further comprises one or more radiation devices 16 provided typically near the reaction area of the disc reactor 19. The radiation devices 16 are sources of different wavelength of rays such as UV rays, infrared rays, alpha, beta, gamma rays and the like. Additionally, the disc surfaces (first surface 14A and second surface 14B) in contact with feed solution can be provided with one or more catalysts to enhance the polymerization.

The product collector 15 provided at base of the disc reactor system 19 system collects the Nanoparticles sprayed through a fluid spray nozzle 10. The product collector 15 is at least one of a circular shaped or cone shaped structure with different body shape and includes a bottom which has two surfaces. The product collector 10 is having one or several outlets and is positioned at different points such as body, corners, bottom, center and intersection of surfaces. The thin film of feed solution produced is in at least one of a liquid form, semi-solid form or solid form. The thin film of feed solution so produced is subjected to high centrifugal acceleration provided by the rotating disc 14. As the heat transfer fluid is highly viscous in nature, the layers of the heat transfer fluid which are closer to the rotating disc 14 are accelerated at higher speed than the layers which are relatively farther from the rotating disc. Thus the subsequent layers of the feed solution spread and flow to the outer edge of the rotating disc 14 at different speeds. The different speed of rotation of the feed solution results in small droplets which tend to come out of the disc from different points. A jag arrangement provided on the outer surface of the rotating disc 14 forces the highly accelerated feed solution to be sprayed out of the disc reactor. The fluid spraying nozzle 10 is provided on the top of the product collector 15 to spray the Nanoparticles produced in the disc reactor. The fluid spraying nozzle 10 is placed in a manner to prevent the sticking of the heat transfer fluid on the walls of the product collector 15.

FIG. 2 is a cross section view of the disc reactor system illustrating flow of heat transfer fluid through the disc reactor, according to one embodiment herein. The disc reactor is provided with a fluid coupling (not shown in FIG. 2, but represented by reference numeral 2 in FIG. 1) on the upper part of the disc reactor. The fluid coupling 2 includes a fluid inlet (not shown in FIG. 2, but represented by reference numeral 1 in FIG. 1) through which the heat transfer fluid is provided to the disc reactor (not shown in FIG. 2, but represented by reference numeral 19 in FIG. 1). The heat transfer fluid flows through a pipe which is enclosed within the shaft (not shown in FIG. 2, but represented by reference numeral 4 in FIG. 1) and flows along the length of the shaft 4 to reach the rotating disc 14, i.e., the first surface 14A of the rotating disc. The fluid coupling 2 further comprises a fluid outlet (not shown in FIG. 2, but represented by reference numeral 3 in FIG. 1) for passage of the heat transfer fluid out of the disc reactor.

The heat transfer fluid provides for the heat variations as required for polymerization of the feed solution from the instance when the feed solution is fed to the rotating disc 14 and continues the transfer of heat until the feed solution exits through the fluid spray nozzle (not shown in FIG. 2, but represented by reference numeral 10 in FIG. 1). The fluid coupling 2 acts as a bypass collector for the heat transfer fluid. After getting accumulated in the fluid coupling 2, the heat transfer fluid exits through the fluid outlet 3 provided in the fluid coupling 2 and fresh fluid enters through the fluid inlet 1. The feed solution is fed on to the rotating disc 14 through a feed inlet 7. The feed solution requires certain fixed temperature to react with catalyst provided on the rotating disc 14. The reaction temperature is achieved by circulating heat transfer fluid to the places surrounding the rotating disc 14. Also temperature control of the component arranged adjacent to the rotating disc 14 is achieved by regulating heat through the heat transfer fluid as the components adjacent to the rotating disc 14 get heated up during the progress of the highly exothermic reactions. To absorb the heat produced near the rotating disc 14, suitably cooled heat transfer fluid is circulated throughout the shaft body 4.

The disc reactor herein includes some or all of the needed equipments for the rotation of the rotating disc like the shaft, the ball bearing, flanges and heat transfer arrangement to be placed over the rotating disc. The feed solution is provided directly on the rotating disc 14 (on the first surface 14A) in the form of a thin film which flows to the outer part of the disc and under centrifugal forces, strikes the wall of the collector and moves out of the reactor through the outlet so that the rotating disc can be used better and the products and also high viscous products are collected and vacated more easily and efficiently. Further the polymerization process continues without the need of stop in production.

As the rotating disc 14 is double layered (first surface 14A and second surface 14B), by reducing the thickness of the first surface 14A the heat transfer rate can be increased.

The nanoparticle production according to the embodiments herein can be in the form of solid or liquid droplets.

Although the disclosure herein is described with various specific embodiments, it will be obvious for a person skilled in the art to practice the system of the disclosure with modifications. However, all such modifications are deemed to be within the scope of the claims.

It is also to be understood that the following claims are intended to cover all of the generic and specific features of the embodiments herein and all the statements of the scope of the invention which as a matter of language might be said to fall there between.

What is claimed is:

1. A disc reactor system for providing polymerization and nanoparticle production, the system comprising:

a rotating disc comprising a first surface and a second surface, wherein said first surface and second surface arranged longitudinally along a single axis of rotation;

a shaft attached to the rotating disc, and wherein the shaft further comprises a ball bearing arrangement and a gear box for rotating the first surface and the second surface of the rotating disc at various speeds;

a ring provided on top of the first surface of the rotating disc;

at least one feed inlet for providing a feed solution to the first surface of the rotating disc, wherein said feed solution being a primary material for the formulation of nanoparticles;

a fluid inlet for providing a heat transfer fluid within a body of the shaft;

a fluid outlet provided in a chamber surrounding the shaft for facilitating exit of the heat transfer fluid;

a product collector for collecting the produced nanoparticles; and at least one product outlet provided on the product collector for facilitating exit of the produced nanoparticles;

at least one flange provided on the shaft of the rotating disc to hold the ball bearing arrangement;

at least one fluid spraying nozzle configured to prevent produced nanoparticles from sticking on to the product collector wall;

wherein the feed solution provided on the first surface of the rotating disc flows from the first surface in the form of a thin film to the second surface of the rotating disc due to centrifugal forces and strikes walls of the product collector and gets accumulated at the bottom of the product collector and exits from the disc reactor through the product outlet.

2. The disc reactor system according to claim 1, wherein the heat transfer fluid is provided to the first surface and the second surface of the rotating disc to enable heat transfer from both the first surface and the second surface.

3. The disc reactor system according to claim 1, further comprises a reactor seat for suppressing the vibrations generated during rotation of the shaft and the rotating disc.

4. The disc reactor system according to claim 1, wherein the product collector further includes at least one heat exchanger to regulate the temperature during nanoparticle production.

5. The disc reactor system according to claim 1, further comprises a gas inlet and a gas outlet, wherein the gas is a reactant to protect the polymerization process and a heat carrier.

* * * * *